(12) United States Patent
Iijima et al.

(10) Patent No.: US 7,250,078 B2
(45) Date of Patent: *Jul. 31, 2007

(54) INK-JET INK AND INK-JET RECORDING METHOD

(75) Inventors: Hirotaka Iijima, Hachioji (JP);
Yasuhiko Kawashima, Iruma (JP);
Kenichi Ohkubo, Hachioji (JP);
Teruyuki Fukuda, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 11/048,248

(22) Filed: Jan. 31, 2005

(65) Prior Publication Data

US 2005/0172855 A1 Aug. 11, 2005

(30) Foreign Application Priority Data

Feb. 9, 2004 (JP) .............................. 2004-031738
Feb. 9, 2004 (JP) .............................. 2004-031740

(51) Int. Cl.
*C09D 11/02* (2006.01)
*G01D 11/00* (2006.01)

(52) U.S. Cl. .................. 106/31.27; 106/31.6; 347/100

(58) Field of Classification Search ............. 106/31.27, 106/31.6; 347/100
See application file for complete search history.

(56) References Cited

U.S. PATENT DOCUMENTS

| | | | | |
|---|---|---|---|---|
| 5,010,125 A | * | 4/1991 | Kruse et al. ................. | 524/308 |
| 5,104,448 A | * | 4/1992 | Kruse ....................... | 106/31.58 |
| 5,663,217 A | * | 9/1997 | Kruse ........................ | 523/161 |
| 5,837,046 A | * | 11/1998 | Schofield et al. ........ | 106/31.86 |
| 6,013,124 A | * | 1/2000 | Saibara et al. ........... | 106/31.86 |
| 6,231,654 B1 | * | 5/2001 | Elwakil .................... | 106/31.47 |
| 2005/0039634 A1 | * | 2/2005 | Hermansky ............... | 106/31.59 |

FOREIGN PATENT DOCUMENTS

| | | |
|---|---|---|
| JP | 09-176538 A | 7/1997 |
| JP | 10-272828 A | 10/1998 |
| JP | 10-316915 A | 12/1998 |

* cited by examiner

*Primary Examiner*—J. A. Lorengo
*Assistant Examiner*—Veronica Faison-Gee
(74) *Attorney, Agent, or Firm*—Frishauf, Holtz, Goodman & Chick, P.C.

(57) ABSTRACT

An ink for ink-jet recording containing: a colorant; and a solvent mixture containing water and solvent A which is not water, wherein solvent A has a surface tension of 25 to 40 mN/m at 25° C.; a viscosity of 1 to 50 mPs·s at 25° C.; and a vapor pressure of not more than 133 Pa at 25° C., a content of solvent A is from not less than 50 to less than 90 weight % based on the total weight of the ink; and a content of water is from not less than 10 to less than 45 weight % based on the total weight of the ink.

21 Claims, No Drawings

INK-JET INK AND INK-JET RECORDING METHOD

FIELD OF THE INVENTION

The present invention relates to a novel ink-jet ink and an ink-jet recording method using the same.

BACKGROUND OF THE INVENTION

In recent years, since ink-jet recording enables simple and less expensive formation of images, it has been applied to various printing fields such as photography, various kinds of printing, marking, and special printing such as color filters. Specifically, by employing ink-jet recording apparatuses which eject minute ink droplets and control them, ink-jet inks which result in an improved range of color reproduction, durability, as well as ejection adaptability, and specialized paper sheets of which ink absorbability, color forming properties of colorants and surface glossiness are markedly improved, it has become possible to result in image quality comparable to conventional silver salt photography.

However, in ink-jet image recording systems which necessitate specialized paper sheets, problems occur in which recording materials are limited and the cost of recording materials increases.

Specifically in offices, a system is increasingly demanded which is capable of performing full-color printing at a high rate without any limitation to recording materials (e.g., plain paper, coated paper, art paper, or double sided printing on plain paper).

Various studies have been conducted with regard to compositions of ink-jet inks capable of achieving higher speed printing, desired text reproduction on plain paper, resulting in no ink penetration to the back surface during printing (being the phenomena in which printed ink passes through the recording material and a printed image appears on the rear surface), no feathering, and no image bleeding, as well as resulting in quick penetration into the recording paper and rapid drying of the image.

As one of these methods, so-called water-based ink-jet inks are widely employed. When images are recorded on plain paper such as copy paper for electrophotography, high quality paper or medium quality paper, in addition to problems such as image penetration to the rear surface and feathering due to penetration, curling and cockling of images recorded on plain paper result in major problems.

In order to overcome the above drawbacks, an ink-jet recording method is disclosed (refer, for example, to Patent Document 1) which employs a penetration-improved ink by specifying the wetting time and the absorption coefficient of recording materials in the Bristow method. However, since colorants in the ink simultaneously penetrate into plain paper, this method results in problems, in which a decrease in image density as well as penetration to the rear surface is enhanced, resulting in unsuitability for both sided printing.

Further, ink-jet ink is disclosed (refer, for example, to Patent Document 2) which incorporates specified amide compounds, pyridine derivatives, imidazoline compounds or urea compounds as an anti-curling agent. However, this method results in problems in which clogging of the nozzle of a recording head tend to occur due to drying of liquid ink.

Still further, proposed is an ink-jet recording method to minimize the above curling (refer, for example, to Patent Document 3), in which curling balance is optimized by providing a solution containing water on the side opposite the image printing surface. However, this method is not fully adequate to print on two surface sides of the recording sheet. And further, this method may result in problems in which along with an increase in the adhered amount of ink as well as curl balance liquid onto plain paper, its strength is deteriorated, whereby jamming tends to occur during conveyance.

Still further, instead of using the water-based ink-jet ink, a solvent-based ink capable of achieving printing at a high rate has been studied. Namely, by employing an oil-based ink (being a solvent-based ink-jet ink), even though printed on plain paper, it is possible to achieve high speed printing due to quick penetration into recording materials, shorter drying time, and no curling of recording materials. However, problems occur in which text is not reproduced as desired and penetration to the rear surface results due to the fact that the solvent based ink easily penetrates plain paper. Especially, these problems were obstacles to print on two surface sides of a plain paper.

(Patent Document 1) Japanese Patent Publication Open to Public Inspection. (hereinafter referred to as JP-A) No. 10-316915

(Patent Document 2) JP-A No. 9-176538

(Patent Document 3) JP-A No. 10-272828

SUMMARY OF THE INVENTION

In view of the foregoing problems, the present invention was achieved. An object of the present invention is to provide an ink which exhibits excellent ejection stability in an ink-jet printer, excellent decap durability, reduced rear surface penetration on a plain paper, excellent text quality of formed images, and reduced curling characteristic of printed recording materials, and an ink-jet recording method using the same.

The aforesaid object of the present invention is achieved employing an ink for ink-jet recording of the present invention.

An embodiment of the present invention includes an ink containing: a colorant; and a solvent mixture containing water and solvent A which is not water, wherein solvent A has a surface tension of 25 to 40 mN/m at 25° C.; a viscosity of 1 to 50 mPa·s at 25° C.; and a vapor pressure of not more than 133 Pa at 25° C., a content of solvent A is a predetermined larger amount than a content of the water in the ink.

Another embodiment of the present invention includes an ink containing: a colorant; and a solvent mixture containing water and at least a first solvent which is not water, a content of water being not less than 10 to less than 45 weight % based on the total weight of the solvent mixture, wherein the ink has a predetermined $\Sigma S_i C_i$ value which is defined by Equation (1) $S_i = (H_i/M_i) \times 1000$, and Equation (2): $\Sigma S_i C_i = (S_0 \times C_0) + (S_1 \times C_1)$, the meaning of the two Equations (1) and (2) will be described below.

According to the present invention, it is possible to provide an ink-jet ink which exhibits excellent ejection stability in an ink-jet printer, excellent decap durability, reduced rear surface penetration on a plain paper, excellent text quality of formed images, and reduced curling characteristic of printed recording materials, and an ink-jet recording method using the same.

DESCRIPTION OF THE PREFERRED EMBODIMENTS

The preferred embodiments of the present invention have the following structures.

(1) An ink for ink-jet recording containing:
a colorant;
a solvent mixture containing water and solvent A which is not water,
wherein solvent A has a surface tension of 25 to 40 mN/m at 25° C.; a viscosity of 1 to 50 mPa·s at 25° C.; and a vapor pressure of not more than 133 Pa at 25° C.,
a content of solvent A is from not less than 50 to less than 90 weight % based on the total weight of the ink; and
a content of water is from not less than 10 to less than 45 weight % based on the total weight of the ink.

(2) The ink for ink-jet recording of item 1, a mixing ratio of solvent A to water is in the range to form a uniform mixture (i.e., to establish compatibility) at 25° C.

(3) The ink for ink-jet recording of item 1 or item 2, wherein the ink has a surface tension of 25 to 35 mN/m at 25° C.

(4) The ink for ink-jet recording of any one of items 1 to 3, wherein the ink has a viscosity of 5 to 40 mPs·s at 25° C.

(5) The ink for ink-jet recording of any one of items 1 to 4, wherein the colorant is a pigment.

(6) A method for recording an ink-jet image comprising the step of:
jetting the ink for ink-jet recording of any one of items 1 to 5 from a plurality of nozzles of an ink-jet head onto two sides of a plain paper.

(7) A method for recording an ink-jet image comprising the step of:
jetting the ink for ink-jet recording of any one of items 1 to 5 from a plurality of nozzles of an ink-jet head onto a plain paper,
wherein the ink-jet head is a piezo type head and each nozzles has a diameter of not more than 30 mm.

(8) A method for recording an ink-jet image comprising the step of:
jetting the ink for ink-jet recording of any one of items 1 to 5 from a plurality of nozzles of an ink-jet head onto a plain paper,
wherein the ink-jet head is a line head of a piezo type and each nozzles has a diameter of not more than 30 mm.

(9) An ink for ink-jet recording comprising:
a colorant; and
a solvent mixture;
said solvent mixture comprising water and at least a first solvent which is not water, a content of water being not less than 10 to less than 45 weight % based on the total weight of the solvent mixture,
said ink having a $\Sigma S_i C_i$ value in the range of from not less than 6 to less than 35, wherein the $\Sigma S_i C_i$ value is the sum for all solvents, where $C_i$ is a weight ratio for each solvent in the solvent mixture, and $S_i$ for each solvent is defined by Equation (1):

$$S_i = (H_i / M_i) \times 1000 \qquad \text{Equation (1)}$$

wherein $H_i$ is a total number of hydroxyl groups and of amino groups in the molecule; and $M_i$ is a molecular weight of the molecule.

(10) The ink of item 9, wherein the solvent mixture contains water and a first solvent, and wherein $\Sigma S_i C_i$ is defined by Equation (2):

$$\Sigma S_i C_i = (S_0 \times C_0) + (S_1 \times C_1) \qquad \text{Equation (2)}$$

wherein $S_0$ represents $S_i$ of the water, $C_0$ represents a weight ratio of the water in the ink; $S_1$ represents $S_i$ of a first solvent, $C_1$ represents a weight ratio of the first solvent in the ink.

(11) The ink of item 9, wherein the solvent mixture further contains a second solvent other than water and the first solvent, and wherein $\Sigma S_i C_i$ is defined by Equation (3):

$$\Sigma S_i C_i = (S_0 \times C_0) + (S_1 \times C_1) + (S_2 \times C_2) \qquad \text{Equation (3)}$$

wherein $S_0$ represents $S_i$ of the water, $C_0$ represents a weight ratio of the water in the ink; $S_1$ represents $S_i$ of the first solvent, $C_1$ represents a weight ratio of the first solvent in the ink; and $S_2$ represents $S_i$ of the second solvent, $C_2$ represents a weight ratio of the second solvent in the ink.

(12) The ink for ink-jet recording of item 9, wherein the $\Sigma S_i C_i$ value of the ink is in the range of from not less than 6 to less than 25.

(13) The ink for ink-jet recording of any one of items 9 to 12, further comprises a surface active agent in an amount of less than 1 weight % based on the total weight of the ink.

(14) The ink for ink-jet recording of item 9, the amount of the surface active agent in the ink is less than 0.1 weight % based on the total weight of the ink.

(15) The ink for ink-jet recording of any one of items 9 to 14, a total amount of the solvents each having $S_i$ in the range of not less than 25 to less than 55 is less than 10 weight % based on the total weight of the ink.

(16) The ink for ink-jet recording of items 15, the total amount of the solvents each having $S_i$ in the range of not less than 25 to less than 55 is less than 5 weight % based on the total weight of the ink.

(17) The ink for ink-jet recording of any one of items 9 to 16, wherein the ink has a surface tension of 25 to 35 mN/m at 25° C.

(18) The ink for ink-jet recording of any one of items 9 to 17, wherein the colorant is a pigment.

(19) A method for recording an ink-jet image comprising the step of:
jetting the ink for ink-jet recording of any one of items 9 to 18 from a plurality of nozzles of an ink-jet head onto a plain paper.

(20) A method for recording an ink-jet image comprising the step of:
jetting the ink for ink-jet recording of any one of items 9 to 18 from a plurality of nozzles of an ink-jet head onto a plain paper,
wherein the ink-jet head moves at a speed of 5 meter per minutes in a sub-scanning direction of the plain paper.

(21) A method for recording an ink-jet image comprising the step of:
jetting the ink for ink-jet recording of any one of items 9 to 18 from a plurality of nozzles of an ink-jet head onto two sides of a plain paper.

The present invention will be detailed below.

The present invention was achieved to resolve the above-mentioned problems. It was found that the ink containing one solvent (solvent A) having a specific surface tension, a specific viscosity and a specific vapor pressure in an amount of not less than 50 to less than 90 weight % based on the total weight of the ink, and a content of water is not less than 10 to less than 45 weight % based on the total weight of the ink can achieve the effects of the present invention. The ink of the present invention can achieve improved ejection adaptability and improved decap resulting in superior ink penetration resistance to the reverse side of the paper, improved character printing quality and improved curling resistance.

As described above, an amount of curling after printing on a plain paper tends to be large when a content of water in an ink is increased. When water is not contained in the ink, such as an oil-based ink, or a solvent ink, curling of a plain paper is small. However, an image density on a printed surface of the paper, is decreased due to the diffusion of the colorant into the interior potion of the paper, or the ink may arrive at the reverse side of the paper.

There is often used a solvent which is not soluble or slightly soluble in water in an oil-based ink, or a solvent ink. The solvent which is not soluble or slightly soluble in water was replaced with a water-soluble ink in an oil-based ink, or a solvent ink, and further, a predetermined amount of water was added to the ink. The ink thus formulated was proved to decrease the penetration speed of the ink in a plain paper and to prevent the reaching of the ink to the reverse side of the paper. It was also found that such formulated ink has a decreased curling property. The decrease of penetration speed of the ink by addition of water is supposed to be based on the following mechanism.

It is known from a measurement of a Bristow value, that the penetration speed of an ink into a plain paper decreases largely by an addition of water into an ink. The decrease of penetration speed by an addition of water cannot fully be explained by a decrease of a surface tension due to a mixture of water and a water-soluble solvent.

It is known that the penetration speed of a solvent to a plain paper generally follows a Lucas-Washburn equation indicated below.

$$h = (r \cdot \gamma \cdot \cos\theta \cdot t / 2\eta)^{1/2}$$

Wherein, h is a distance of penetration of an ink, r is a diameter of a capillary, γ is a surface tension of a liquid, θ is a contact angle of a plain paper and an ink, t is a time and η is a viscosity of an ink.

According to the above equation, the decrease of penetration by an addition of water can be interpreted by an effect of an increase of a contact angle θ of a plain paper and a droplet of an ink.

Generally, a contact angle θ at an interface of a liquid and a solid is expressed by a modification of a Young-Forkes equation as indicated below.

$$\theta = \cos^{-1}\{2[(\gamma S^d \cdot \gamma L^d)^{1/2} + (\gamma S^P \cdot \gamma L^P)^{1/2} + (\gamma S^h \cdot \gamma L^h)^{1/2}]/\gamma L - 1\}$$

wherein, θ is a contact angle, $\gamma S^d$ is a dispersion component in a surface tension of a solid (a plain paper), $\gamma S^P$ is a polar component in a surface tension of a solid (a plain paper), $\gamma S^h$ is a hydrogen-bonding component in a surface tension of a solid (a plain paper), $\gamma L^d$ is a dispersion component in a surface tension of a liquid (an ink), $\gamma L^P$ is a polar component in a surface tension of a liquid (an ink), $\gamma L^h$ is a hydrogen-bonding component in a surface tension of a liquid (an ink) and γL is expressed by the following equation.

$$\gamma L = [(\gamma L^d)^2 + (\gamma L^P)_2 + (\gamma L^h)^2]^{1/2}$$

In the above equation, regarding to each value of $\gamma L^d$, $\gamma L^P$ and $\gamma L^h$ a water-soluble solvent alone has a small $\gamma L^P$ and $\gamma L^h$, whereas-water has extremely large $\gamma L^h$. When water and a water-soluble solvent having the above-mentioned properties are mixed, such a mixed solvent has a relatively large $\gamma L^h$ value as an ink due to the effect of a large $\gamma L^h$ value of water. As a result, by an interaction with a $\gamma S^h$ component of a plain paper, the wetting property of the ink to the plain paper is weakened. This effect is considered to be a reason of a decrease of penetration of the above-mentioned mixed ink to the pain paper.

However, the above described effect cannot be achieved only by misting a water-soluble solvent and water. It is required to mix them in a specific ratio range, and the water-soluble solvent should have the following properties:

(1) a surface tension of 25 to 40 mN/m at 25° C.;
(2) a viscosity of 1 to 50 mPa·s at 25° C.; and
(3) a vapor pressure of not more than 133 Pa at 25° C.

The object of the present invention may be achieved by using the water-soluble solvent having all of the properties of (1)-(3) described above.

When a water-soluble solvent having a surface tension of less than 25 mN/m is used, it is hard to control the penetration to the plain paper even by refraining a content of added water to less than 45 weight %. On the other hand, when a water-soluble solvent having a surface tension of not less than 40 mN/m is used, the printed paper tends to produce an unwanted large amount of curling.

When a water-soluble solvent having a viscosity of not less than 50 mPa·s is used, it becomes hard to adjust the viscosity of the ink to be not more than 40 50 mPa·s which is considered to be preferable for stably eject the ink form nozzles of an ink-jet head, even by refraining a content of added water to less than 45 weight %.

When a water-soluble solvent having a vapor pressure more than 133 Pa, a vaporization speed at the nozzles becomes too large to produce decap.

As described above, in printing on a plain paper, penetration to the reverse side and curling are in a trade-off relationship. A water-based ink containing a large amount of water shows good character reproduction and efficient restraint on reverse penetration. However, it tends to have a defect to produce curling of paper. While an oil-based ink may not produce curing of paper, it tends to show inferior character reproduction and it easily causes ink penetration to the reverse side of the paper.

The present invention was achieved by a specific ink which is controlled an amount of water in the solvent, and by selecting the solvent having a specific parameter related to a molecular structure of the solvent. It was found that the above-mentioned trade-off was resolved by an ink-jet ink containing an adequately selected solvent to achieve a good printing property. In an ink-jet ink containing a colorant, a solvent mixture (water and a solvent which is not water), the following properties are found to be effective to achieve the present invention: a content of water in the ink is in an amount of not less than 10 weight % to less than 45 weight %; and the ink has a $\Sigma S_i C_i$ value from 6 to less than 35, and more preferably from 6 to less than 25, $\Sigma S_i C_i$ and $S_i$ each being defined by Equation (1) and Equation (2). It was found that the ink-jet ink having such properties shows good character reproduction, effective restraint of ink penetration to the reverse side of the paper and decrease of curling for a plain paper.

After investigation of the relationship between the properties of a solvent and curling, it was found that an amount of curling tends to be more pronounced when a content ratio of a hydroxyl group and an amino group to the molecular weight of a solvent is larger. The tendency of curling is expressed as a parameter represented by: (A total number of a hydroxyl group and an amino group)/(molecular weight of a solvent). In the case of a mixture of solvents, it was found that there is a specific range of a sum, calculated by (each parameter)×(composition ratio), which is effective to prevent curling of paper.

The present invention is not limited by a mechanism of prevention of curling, however, the mechanism is supposed to be as follows:

When the content ratio of a hydroxyl group and an amino group in a molecule is higher, hydrophilicity of the molecule becomes larger. Further, a hydroxyl group and an amino group are capable of forming a hydrogen bonding interaction. Therefore, a compound having a large amount of hydroxyl group and amino group has an affinity to cellulose having a hydrophilic property, and at the same time, it forms a hydrogen bond to cellulose. Cellulose is swelled by the hydrogen bond resulting in curling of paper. In the case of a mixture of solvents, the tendency of swelling of cellulose is represented by a sum of hydrophilicity. The correlation between curling and a sum of a parameter of each solvent in proportion to the ratio of the composition is supposed to be based on the above-mentioned mechanism.

Good character reproduction is achieved and ink penetration to the reverse side of the printed paper is prevented by controlling the content of water in the ink to be not less than 10 weight %. Moreover, prevention of curling of paper is achieved by controlling the content of water in the ink to be less than 45 weight %, and a $\Sigma S_i C_i$ value defined by Equations (1) and (2) to be between not less than 6 and less than 35, more preferably to be between not less than 6 and less than 25.

$$S_i=(H_i/M_i) \times 1000 \qquad \text{Equation (1)}$$

wherein $H_i$ is a total number of hydroxyl groups and amino groups in the molecule; and $M_i$ is a molecular weight of the molecule (a solvent or water).

$$\Sigma S_i C_i = (S_0 \times C_0) + (S_1 \times C_1) \qquad \text{Equation (2)}$$

wherein $S_0$ represents $S_i$ of water, $C_0$ represents a weight ratio of the water in the ink; $S_1$ represents $S_i$ of a first solvent, $C_1$ represents a weight ratio of the first solvent in the ink.

When the solvent mixture further contains a second solvent, Equation (3) is applied to obtain the $\Sigma S_i C_i$ value, $$\Sigma S_i C_i = (S_0 \times C_0) + (S_1 \times C_1) + (S_2 \times C_2) \qquad \text{Equation (3)}$$

wherein $S_0$ represents $S_i$ of the water, $C_0$ represents a weight ratio of the water in the ink;

$S_1$ represents $S_i$ of the first solvent, $C_1$ represents a weight ratio of the first solvent in the ink; and $S_2$ represents $S_i$ of the second solvent, $C_2$ represents a weight ratio of the second solvent in the ink.

The ink of the present invention may further contain a third solvent, a forth solvent and an $n^{th}$ solvent.

When the solvent mixture further contains a plurality of solvents (from a first to an $n^{th}$ solvent), Equation (n+1) is applied to obtain the $\Sigma S_i C_i$ value, $$\Sigma S_i C_i = (S_0 \times C_0) + (S_1 \times C_1) + (S_2 \times C_2) + \ldots + (S_n \times C_n) \qquad \text{Equation (n+1)}$$

wherein, $n^{th}$ is an integer of 3 or more, Sn represents $S_i$ of an $n^{th}$ solvent, $C_n$ represents a weight ratio of the $n^{th}$ solvent in the ink.

($S_i$ Value)

The $S_i$ value will be explained by using some examples.

The $S_i$ value is, as described above, a total number of a hydroxyl group (—OH), and amino groups (—NH—, —NH$_2$, —NH$_3^+$). Any one of each group is counted as one.

For example, ethylene glycol, HO—CH$_2$—CH$_2$—OH, is calculated as: Number of OH is 2, number of an amino group is 0, and molecular weight is 62.1, therefore, $$S_i=(2/62.1) \times 1000 = 32.2$$

Triethanolamine, N(CH$_2$—CH$_2$—OH)$_3$, is calculates as: Number of OH is 3, number of an amino group is 0, and molecular weight is 149, therefore, $$S_i=(3/149) \times 1000 = 20.1$$

2-Pyrolidone is calculated as: Number of OH is 0, number of an amino group is 1, and molecular weight is 85.1, therefore, $$S_i=(1/85.1) \times 1000 = 11.7$$

Water is calculated as: Number of OH is 1 (defined in this invention) and molecular weight is 18, therefore, $$S_i=(1/18) \times 1000 = 55.6$$

The $S_i$ values of an organic solvent and water can be obtained as described above.

In the present invention, each $S_i$ value of a solvent and water in the ink are calculated. The solvent is selected and a content ratio of the solvent and a content of water are controlled so that a sum of $S_i$ value is adjusted to be within a predetermined preferable value. By controlling such formulation of solvent and water, the ink-jet ink of the present invention can be obtained. In addition to such control, more preferable effect can be achieved by controlling an amount of a surface active agent or an amount of a solvent having a large $S_i$ value to a limited value.

In the ink-jet ink (hereafter it is called also as the ink) of the present invention, an amount of a surface active agent in the ink is related with the phenomena of reverse side penetration. The amount of a surface active agent in the ink is preferably less than 1 weight %, and is more preferably less than 0.1-weight % based on the total weight of the ink.

It is preferable that a total amount of the solvents each having $S_i$ in the range of not less than 25 to less than 55 in order to decrease curling. The total amount of the solvents is preferably less than 10 weight %, and more preferably, less than 5 weight %. When a total amount of a surface active agent and a solvent is large, the printed paper tends to exhibit curling. It is supposed that a surface active agent and a solvent having $S_i$ in the range of not less than 25 to less than 55 interact with cellulose in the paper through a hydrogen bond. This interaction should be the cause of curling.

One of the characteristics of the ink of the present invention is that the ink has both a good penetration property and a good drying property. In recent years, it has been developed a line head having the same width as a paper to be recorded. This head enables to achieve a higher printing speed than the conventionally used shuttle head. In such high speed printer, it may occur a problem of transfer of the printed ink to the reverse side of the another paper when the printed paper are superimposed one after another. Therefore, a high penetration speed and a high drying speed are required for the ink. The ink of the present invention has an advantage of having a high penetration speed and a high drying speed, resulting in short staying time of the surface of the printed paper. As a result, the ink is especially adequate for a high speed printing method as described above. The ink of the present invention can be sued for the printing method at a speed of 5 m/minute or higher in a sub-scanning direction (a direction of conveying paper).

The ink of the present invention is effectively used in printing on two surface of a paper. In two surface printing, usually a printed paper on one surface is conveyed facing the printed surface to the conveying means. As the ink of the present invention has the above-described properties, the problems of transport defect or staining of a conveying belt are not easily occur.

It may occur reverse side penetration or smearing of a printed image when an amount of water in the ink is less than the range of the present invention. And it may occur curling of the printed paper when an amount of water in the ink is larger than the range of the present invention. When a $\Sigma S_i C_i$ value of the ink is smaller than the range of the present invention, the ink system becomes too hydrophobic to dissolve water, failing to prepare an ink. On the other hand when a $\Sigma S_i C_i$ value is tool large, curling of the paper is strong.

The detail of the present invention will be further described.

The ink-jet ink of the present invention (called as simply, the ink) contains a water-soluble solvent (called as solvent A) having the aforesaid properties of: a surface tension of 25 to 40 mN/m at 25° C.; a viscosity of 1 to 50 mPa·s at 25° C.; and a vapor pressure of not more than 133 Pa at 25° C. The amount of solvent A contained in the ink is 50 to less than 90 weight % based on the total weight of the ink.

The ink of the present invention have more preferably; a surface tension of 25 to 32 mN/m at 25° C.; a viscosity of 1 to 30 mPa·s at 25° C.; and a vapor pressure of 1 to 67 Pa at 25° C.

The solvents used for the present invention are not limited as long as they satisfy the above-mentioned three requirements. Specific examples of Solvent A, according to the present invention, are as follows:

Ethylene glycol monobutyl ether; diethylene glycol monomethyl ether, diethylene glycol monoethyl ether, diethylene glycol monopropyl ether, diethylene glycol monobutyl ether; triethylene glycol monomethyl ether, triethylene glycol monoethyl ether, triethylene glycol monopropyl ether, triethylene glycol monobutyl ether; tetraethylene glycol monomethyl ether; tetraethylene glycol monoethyl ether; propylene glycol monobutyl ether; dipropylene glycol monomethyl ether, dipropylene glycol monoethyl ether, dipropylene glycol monopropyl ether; tripropylene glycol monomethyl ether, tripropylene glycol monoethyl ether, tripropylene glycol monopropyl ether, tripropylene glycol monobutyl ether; tetrapropylene glycol monomethyl ether; diethylene glycol diethyl ether, diethylene glycol dibutyl ether; triethylene glycol diethyl ether, triethylene glycol dibutyl ether; dipropylene glycol dibutyl ether; tripropylene glycol dibutyl ether; 3-methyl-2,4-pentanediol; and diethylene glycol monoethyl ether acetate.

In the present invention, it is possible to obtain the viscosity as well as the vapor pressure of each of the individual solvent and mixtures thereof by referring to data of each described, for example, in "Shinpan Solvent Pocket Book (New Edition Solvent Pocket Book)" edited by Yuki Gosei Kagaku Kyokai, Omu Sha (1994), or by employing prior art methods.

The ink of the present invention is characterized in preferably containing water in an mount of from not less than 10 weight % to less than 45 weight %, and more preferably, from not less than 10 weight % to less than 30 weight % based on the total weight of the ink. By adjusting the content of water in the ink, it is possible to achieve a preferable condition for increased penetration speed of the ink into a plain paper and an appropriate curling property of the paper.

Other than each of the solvents according to the present invention, various types of functional additives are incorporated in the ink of the present invention.

The aforesaid solvents in the ink of the present invention contain, if desired, colorants as well as various additives described below. Preferably employed as colorants used in the present invention are, for example, yellow, magenta, cyan, black, blue, green or red colorants. Of these, yellow, magenta, cyan, and black colorants are particularly favored.

It is possible to apply the ink of the present invention to various types of ink-jet inks such as a dye ink which employs dyes as a colorant, a pigment ink in which colorants are insoluble in the solvents constituting the ink-jet ink, and a dispersion system containing minute pigment particles is formed, or a dispersion ink which is composed of a dispersion of polymers colored with colorants.

Listed as dyes usable in the present invention may be azo dyes, methine dyes, azomethine dyes, xanthene dyes, quinone dyes, phthalocyanine dyes, triphenylmethane dyes, and diphenylmethane dyes. Listed as specific compounds may, for example, be dyes exemplified in JA-A No. 2002-264490.

Further, selected as oil-soluble dyes, which form minute colored particles together with the aforesaid polymers to become colorants, are dyes such as disperse dyes which are soluble in organic-solvents having no water-soluble group such as carboxylic acid or sulfonic acid and which are insoluble in water. Further, included are dyes which are prepared in such a manner that water-soluble dyes are modified to become oil-soluble ones through formation of salts with long chain bases. For example, known are dyes such as acid dyes, direct dyes, or reactive dyes which form salts with long chain amines.

However, in the ink of the present invention, it is preferred that pigments are employed as a colorant. For resulting in sufficient exhibition of the targeted effects, pigments which are insoluble in the aforesaid solvent system are preferred.

Employed as pigments usable in the present invention may be those known in the prior art without any limitation. It is possible to use either water-dispersible dyes or oil-dispersible dyes. It is also possible to preferably use, for example, organic pigments such as insoluble pigments or lake pigments, as well as inorganic pigments such as carbon black.

Examples of preferred insoluble pigments include, but not particularly limited to, azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, and diketopyrrolopyrrole.

Listed as specific pigments which are preferably usable are those below.

Examples of pigments for magenta or red include: C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48: 1, C.I. Pigment Red 53:1, C.I. Pigment Red 57: 1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of pigments for orange or yellow are, include: C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 93, C.I. Pigment Yellow 94, and C.I. Pigment Yellow 138.

Examples of pigments for green or cyan include: C.I. Pigment Blue 15, C.I. Pigment Blue 15: 2, C.I. Pigment Blue 15: 3, C.I. Pigment Blue 16, C.I. Pigment Blue 60, and C.I. Pigment Green 7.

In addition to the above, when intermediate colors are required, it is preferable that the following pigments are employed singly or in combination. Examples of employed pigments include:

C.I. Pigment Red 177, 194, 209, and 224,
C.I. Pigment Orange 43
C.I. Vat Violet 3
C.I. Pigment Violet 19, 23, and 37
C.I. Pigment Green 7 and 36
C.I. Pigment Blue 15: 6

Further examples of pigments for black are include: C.I. Pigment Black 1, C.I. Pigment Black 6, and C.I. Pigment Black 7.

It is preferable that pigments employed in the present invention are dispersed together with dispersing agents and necessary additives to achieve various desired purposes, employing a homogenizer and then employed, such as those known in the art, including a ball mill, a sand mill, or a high pressure homogenizer.

The average particle diameter in the pigment dispersion employed in the ink of the present invention is preferably 10-200 nm, is more preferably 10-100 nm, but is still more preferably 10-50 nm. When the average particle diameter in the pigment dispersion exceeds 100 nm, the resulting dispersion becomes unstable, while when it is less than 10 nm, stability of the pigment dispersion is degraded, whereby storage stability of the ink tends to become deteriorated.

It is possible to determine the particle diameter of a pigment dispersion employing commercially available diameter measurement devices using a light scattering method, an electrophoretic method, or a laser Doppler method. Further, at least 100 particle images are captured employing a transmission type electron microscope, whereby it is possible to determine the particle diameter in such a manner that the resulting images are subjected to statistical processing employing image analysis software such as Image-Pro (produced by Media Cybernetics).

In the ink-jet ink of the present invention, employed as additives during dispersion may be surface active agents. Employed as surface active agents usable in the present invention may be any of cationic, anionic, amphoteric, or nonionic surface active agents.

Listed as cationic surface active agents are aliphatic amine salts, aliphatic quaternary ammonium salts, benzalconium salts, benzetonium chloride, pyridinium salts, and imidazolinium salts.

Listed as anionic surface active agents are fatty acid soap, N-acyl-N-methylglycine salts, N-acyl-N-methyl-β-alanine salts, N-acylglutamic acid salts, acylated peptides, alkylsulfonic acid salts, alkylbenzenesulfonic acid salts, alkylnaphthalenesulfonic acids, dialkylsulfosuccinic acid ester salts, alkylsulfoacetic acid salts, α-olefinsulfonic acid salts, N-acylmethyltaurine, sulfonated oil, higher alcohol sulfuric acid ester salts, secondary higher alcohol sulfuric acid ester salts, alkyl ether sulfuric acid salts, secondary higher alcohol ethoxysulfates, polyoxyethylene alkyl phenyl ether sulfuric acid salts, monoglysulfates, fatty acid alkylolamide sulfuric acid ester salts, alkyl ether phosphoric acid ester salts, and alkylphosphoric acid ester salts.

Listed as amphoteric surface active agents are carboxybetaine type, sulfobetaine type, aminocarboxylic acid salts, and imidazoliniumbetaine.

Listed as nonionic surface active agents are polyoxyethylene secondary alcohol ether, polyoxyethylene alkyl phenyl ether, polyoxyethylene sterol ether, polyoxyethylene lanolin derivatives, polyoxyethylene polyoxypropylene alkyl ether, polyoxyethylene glycerin fatty acid ester, polyoxyethylene sunflower flower oil, hardened sunflower oil, polyoxyethylene sorbitol fatty acid ester, polyethylene glycol fatty acid ester, fatty acid monoglyceride, polyglycerin fatty acid ester, sorbitan fatty acid ester, propylene glycol fatty acid ester, sucrose fatty acid ester, fatty acid alkanolamide, polyoxyethylene fatty acid amide, polyoxyethylene alkylamine, alkylamine oxide, acetylene glycol, and acetylene alcohol.

Further, in order to accelerate penetration of ink droplets after ink ejection into plain paper, it is preferable to use surface active agents. The above surface active agents are not limited as long as they do not adversely affect storage stability of inks. Employed as such surface active agents may be the same ones which are used as an additive during the aforesaid dispersion.

Further, the total content of calcium ions, magnesium ions, and iron ions, all of which are multivalent metal ions in the ink of the present invention, is preferably at most 10 ppm, is more preferably 0.1-5 ppm, but is most preferably 0.1-1 ppm.

By controlling the content of multivalent metal ions in an ink-jet ink within the above specified range, it is possible to obtain inks exhibiting high dispersion stability. Multivalent metal ions related to the present invention are incorporated in the form of sulfates, chlorides, nitrates, acetates, organic ammonium salts, and EDTA salts.

In the ink of the present invention, in response to purposes to enhance ejection stability, adaptability to printing heads and ink cartridges, storage stability, and image retention properties, if desired, other than those described above, it is possible to appropriately select and employ various types of prior art additives such as polysaccharides, viscosity modifiers, specific resistance controlling agent, film forming agents, UV absorbers, antioxidants, anti-discoloring agents, antiseptic agents, or anti-rusting agents. Examples include minute oil droplets of liquid paraffin, dioctyl phthalate, tricresyl phosphate, or silicone oil, UV absorbers described in JP-A Nos. 57-74193, 57-87988, and 62-261476, anti-discoloring agents described in JP-A Nos. 57-74192, 57-87989, 60-72785, 61-146591, 1-95001, and 3-13376, as well as optical brightening agents described in JP-A Nos. 59-42993, 59-52689, 62-280069, 61-242871, and 4-219266.

The surface tension of the ink of the present invention, which is constituted, as above, is preferably 25-40 mN/m at 25° C., is more preferably 25-35 mN/cm, but is still more preferably 30-35 mN/cm. Further, ink viscosity is preferably 1-40 mPa·s, at 25° C., is more preferably 5-40 mPa·s, but is still more preferably 5-15 mPa·s. Still further, oxygen concentration dissolved in the ink of the present invention is preferably a maximum of 2 ppm at 25° C. By satisfying the above conditions for the dissolved oxygen concentration, it is possible to minimize formation of air bubbles, whereby it is possible to realize an ink-jet recording method which results in excellent ejection stability even during high speed printing. It is possible to determine the amount of oxygen dissolved in the ink employing, for example, a dissolved oxygen measurement apparatus DO-14P (produced by DKK-TOA Corp.).

In the image forming method employing the ink-jet ink of the present invention, ink-jet prints are obtained in such a manner that ink droplets are ejected from the ink-jet heads based on digital signals, employing an ink-jet printer loaded with ink-jet ink.

During image formation by ejecting the ink of the present invention, employed ink-jet heads may use either an on-demand system or a continuous system. Further, employed as an ejection system may be any of the electric-mechanical conversion system (e.g., a single-cavity type, a double-cavity type, a bender type, a piston type, a share mode type, or a shared wall type), or an electric-thermal conversion system (e.g., a thermal ink-jet type, or a Bubble Jet (registered trade name) type.

In these methods, the ink-jet recording method of the present invention is characterized in that recording is performed on recording materials by ejecting the ink of the present invention from piezo type ink-jet recording heads at a maximum nozzle diameter of 30 μm, further, recording is performed on recording materials by ejecting the ink of the present invention from piezo type ink-jet recording heads at a nozzle diameter of at most 30 μm of the line head system, or recording is performed on recording materials employing piezo type ink-jet recording heads at a maximum nozzle diameter of 30 μm at a printing rate of 20 ppm.

By carrying out printing, employing recording heads of the line head system as an ink-jet printer system instead of using the recording heads of the shuttle head system, it is possible to fully utilize the printing characteristics of the ink of the present invention. As a result, it is possible to achieve the most desirous dot shape (circularity) during the deposition of ink droplets on recording materials, as well as desired printing accuracy.

One of the features of the ink-jet recording method of the present invention is to print on both surfaces of a plain paper (a non-special paper).

Printing on both surfaces is often done by printing at first on one surface, and then the printed paper is reversed to print on the other non-printed surface. In that case, the paper is conveyed with keeping the printed surface downside. As the ink of the present invention has the aforementioned properties, printed ink is hard to attain to the other side of the paper and smear of the character is hard to occur. Therefore, the quality of the printed characters is high, and troubles of conveyance and stain by the ink are hardly to occur.

Plain paper employed in the ink-jet recording method of the present invention is not particularly limited, but non-coated paper, special printing sheet paper, and 80-200 μm thick non-coated paper belonging to a part of information sheet paper are preferred. Such plain paper according to the present invention is composed of chemical pulp represented by LBKP and NBKP, sizing agents, and fillers as major components, as well as, if desired, paper making aids, and is made employing conventional methods. Simultaneously employed as pulp materials used to make the plain paper according to the present invention may be mechanical pulp and recycled waste paper pulp. Further, these may be employed as main components without any problem.

Listed as internally added sizing agents are, for example, rosin size, AKD, al-nickel succinic anhydride, epichlorohydrin, cationic starch, and acrylamide.

Further listed as fillers which are internally added to the plain paper according to the present invention are, for example, minute particle silicic acid powder, aluminum silicate, diatomaceous earth, kaolin, kaolinite, halloysite, nacrite, dickite, pyrophylite, sericite, titanium dioxide, and bentonite.

In view of minimizing the rear surface penetration of the ink of the present invention, and enhancing fixability of colorants, the pliant paper according to the present invention may incorporate water-soluble multivalent metal salts.

The water-soluble multivalent metal salts usable in the plain paper according to the present invention are not particularly limited. For example, added are salts of metals such as aluminum, calcium, magnesium, zinc, iron, strontium, barium, nickel, copper, scandium, gallium, indium, titanium, zirconium, tin, or lead, as well as salts such as sulfates, nitrates, formates, succinate, malonate, chloroacetate, or toluenesulfonates. Further, employed as salts of water-soluble multivalent metal ions may be water-soluble inorganic polymers such as polychlorinated aluminum. In terms of solubility in water, preferred are those which exhibit at least 0.1 percent by weight and are more preferred which exhibit at least 1 percent by weight. Of these, preferred are water-soluble salts composed of aluminum, calcium, aluminum, magnesium, or zinc, because metal ions of the resulting salts are colorless. Particularly preferred are aluminum chloride, aluminum sulfate, aluminum nitrate, aluminum acetate, calcium chloride, calcium sulfate, calcium nitrate, calcium acetate, magnesium sulfate, magnesium nitrate, magnesium acetate, zinc chloride, zinc sulfite, zinc nitrate, and zinc acetate.

EXAMPLES

The present invention will now be described with reference to examples; however, the present invention is not limited thereto.

Example 1

<<Preparation of Inks>>

(Preparation of Pigment Inks 1-18)

A pigment, a water-soluble solvent, water and resin 1 were blended in the combinations listed in Table 1. Thereafter, the resulting mixture was sealed in a glass bottle together with 200 g of 1 mm diameter zirconia beads and was dispersed over a period of two hours, employing a paint shaker, whereby each of the pigment dispersions was prepared. Subsequently, the zirconia beads were removed. Thereafter, resin 2 (added to some of the inks), a surface active agent (added to some of the inks) and antiseptic agents, listed in Table 1, where added to the resulting pigment dispersion and vigorously mixed. Subsequently, the resulting liquid composition was subjected to filtration and also to a membrane degassing treatment employing a hollow fiber membrane, whereby Pigment Inks 1-18 were prepared.

(Preparation of Dye Inks 1-5)

In the combinations listed in Table 1, a dye, a water-soluble solvent, water and resin 1 were blended and dissolved. Thereafter, each of the resulting solutions was subjected to filtration and a membrane degassing treatment, employing a hollow fiber membrane, whereby Dye Inks 1-5 where prepared.

The numeric values listed in Table 1 refer to part by weight.

TABLE 1

| Ink No. | Water-soluble Solvent | | Water | Colorant | | Resin 1 | Resin 2 | | Surface Active Agent S104 | Antiseptic Agent Proxel |
| --- | --- | --- | --- | --- | --- | --- | --- | --- | --- | --- |
| | Type | Added Amount | | Type | Added Amount | | Type | Added Amount | | |
| Pigment Ink 1 | DPGmME | 70 | 25 | Pigment Red 122 | 4.0 | 1.0 | — | — | — | 0.1 |

TABLE 1-continued

| Ink No. | Water-soluble Solvent Type | Water-soluble Solvent Added Amount | Water | Colorant Type | Colorant Added Amount | Resin 1 | Resin 2 Type | Resin 2 Added Amount | Surface Active Agent S104 | Antiseptic Agent Proxel |
|---|---|---|---|---|---|---|---|---|---|---|
| Pigment Ink 2 | DPGmEE | 80 | 15 | Pigment Blue 15:4 | 4.0 | 0.7 | *1 | 0.5 | — | 0.1 |
| Pigment Ink 3 | TPGmME | 85 | 10 | Pigment Black7 | 4.0 | 1.0 | — | — | 0.1 | 0.1 |
| Pigment Ink 4 | DEGmBE | 70 | 25 | Pigment Yellow93 | 4.0 | 1.0 | — | — | — | 0.1 |
| Pigment Ink 5 | EGmBE | 25 | 70 | Pigment Red 122 | 4.0 | 1.0 | — | — | — | 0.1 |
| Pigment Ink 6 | Tpgmme | 95 | 0 | Pigment Blue 15:4 | 4.0 | 1.0 | — | — | 0.1 | 0.1 |
| Pigment Ink 9 | Dpgmme | 60 | 35 | Pigment Red 122 | 4.0 | 1.0 | — | — | — | 0.1 |
| Pigment Ink 10 | Dpgmee | 70 | 25 | Pigment Red 122 | 4.0 | 0.7 | Latex | 0.3 | — | 0.1 |
| Pigment Ink 11 | Tpgmme | 80 | 15 | Pigment Blue 15:4 | 4.0 | 0.5 | *1 | 0.5 | 0.1 | 0.1 |
| Pigment Ink 12 | Dpgmme | 85 | 10 | Pigment Blue 15:4 | 4.0 | 1.0 | — | — | — | 0.1 |
| Pigment Ink 13 | 2,4-pdo | 70 | 25 | Pigment Black 7 | 4.0 | 1.0 | *1 | 0.3 | — | 0.1 |
| Pigment Ink 14 | Egmbe | 60 | 35 | Pigment Black 7 | 4.0 | 1.0 | — | — | — | 0.1 |
| Pigment Ink 15 | Tpgmme | 30 | 65 | Pigment Red 122 | 4.0 | 1.0 | — | — | 0.1 | 0.1 |
| Pigment Ink 16 | Degmbe | 95 | 0 | Pigment Red 122 | 4.0 | 1.0 | — | — | — | 0.1 |
| Pigment Ink 17 | Glycerol | 70 | 25 | Pigment Blue 15:4 | 4.0 | 1.0 | — | — | — | 0.1 |
| Dye Ink 1 | 2,4-pdo | 80 | 15 | Oilblack 1 | 4.8 | — | *2 | 0.2 | — | 0.1 |
| Dye Ink 3 | Dpgmee | 70 | 25 | Oilblack 1 | 5.0 | — | — | — | — | 0.1 |
| Dye Ink 4 | DEGmBE | 80 | 15 | Oilblack 1 | 4.0 | — | — | — | 0.1 | 0.1 |

*1: Neutralized compound of Alginic acid
*2: Neutralized compound of Pectinic acid Each of the additives, which are abbreviated in above Table 1, is as follows:

<Water-Soluble Solvent>
DPGmME: dipropylene glycol monomethyl ether
DPGmEE: dipropylene glycol monoethyl ether
TPGmME: tripropylene glycol monomethyl ether
TEGmBE: triethylene glycol monobutyl ether
DEGmBE: diethylene glycol monobutyl ether
2,4-PDO: 2-mehtyl-2,4-pentandiol
EGmBE: ethylene glycol monobutyl ether
1,5-PDO: 1,5-pentanediol
EtOH: ethanol
2-PDN: 2-pyrroidone
DEG: diethylene glycol In Table 2 are listed the values of surface tension, viscosity and vapor pressure of each of the water-soluble solvents at 25° C.

TABLE 2

| Water-soluble solvent | Surface tension (mN/m) | Viscosity (mPa · s) | Vapor pressure (Pa) |
|---|---|---|---|
| DPGmME | 29 | 3.2 | 53 |
| DPGmEE | 28 | 3.3 | 40 |
| TPGmME | 30 | 6.2 | 4 |
| DEGmBE | 34 | 6.1 | 1.3 |
| 2,4-PDO | 26 | 31.0 | 2.7 |
| EGmBE | 27 | 3.2 | 113 |
| DEG | 48 | 30.0 | less than 1.3 |
| Glycerol | 62 | 948 | less than 1.3 |
| 1,5-PDO | 43 | 110 | less than 1.3 |
| 2-PDN | 47 | 13 | not less than 1300 |
| EtOH | 22 | 1.1 | 5.9–10000 |

Measured at 25° C.,
(N.B.: 133 Pa = 1 mmHg)

<Polymer Compound>
Resin 1: copolymer at a weight average molecular weight of 12,000, prepared by copolymerizing methacrylic acid, methyl methacrylate, 2-ethylhexyl methacrylate, and hydroxyethyl acrylate (at a weight ratio of 40/20/10/30)

Latex: Nipol SX-1706

<Surface Active Agent>
S-104: Surfinol 104 (produced by Air Products Co.)

<Antiseptic Agent>
Proxel: product of Avecia Limited

<<Evaluation of Ink>>

(Evaluation of Jetting Property)

The aforementioned pigment inks 1-18 and dye inks 1-5 were subjected to an ejecting adaptability evaluation by employing a share mode piezo type recording head of a nozzle aperture diameter of 25 μm, a volume of ejected ink droplets of 4 pl, a driving frequency of 10 kHz and a nozzle number 512. The driving voltage was controlled so as to regulate the jetting speed to be 6 m/s.

Ejection of the ink was done at 25° C., under a relative humidity of 50%. Each ink was ejected in an amount of 500 ml, and visually observed the irregular bending or defect of ejection from the start till the end. The evaluation was done according to the following criteria.

A: ejection was done until end
B: totally 1-20 nozzles produced bending or defect
C: totally 21-40 nozzles produced bending or defect
D: totally more than 41 nozzles produced bending or defect (Evaluation of Decap Resistance)

The aforementioned pigment inks 1-18 and dye inks 1-5 were evaluated according to the following method. At an ambience of 23° C. and 20 percent relative humidity, a share mode piezo type recording head of a nozzle aperture diameter of 25 μm, a volume of ejected ink droplets of 4 pl, a driving frequency of 10 kHz and a nozzle number 256 was employed. A voltage applied to the recording head was controlled so that the rate of ink droplets reached 8 m/second during an ejection interval of 50 milliseconds as the initial state. Subsequently, the ejection interval was varied and the relative ratio of the liquid droplet rates was determined based on the formula below, whereby decap resistance was evaluated based on the criteria below.

For example, 100 ink droplets were ejected at an ejection interval of 50 microseconds, and 100 ink droplets were also ejected t second after the initial ejection at an ejection interval of 50 microseconds. Subsequently, the rate of the initial ink droplet after interval time t was determined and the resulting value was designated as the ink droplet rate after interval time t.

The relative ratio of ink droplet rate (in percent)=(rate of ink droplet after interval time t)/(rate of ink droplet at an ejection interval of 50 milliseconds)

A: interval time t was at least 10 seconds during which relative ratio of ink droplet rate became at most 70 percent B: interval time t was 1-10 seconds during which relative ratio of ink droplet rate became at most 70 percent C: interval time t was 0.3-1 seconds during which relative ratio of ink droplet rate became at most 70 percent D: interval time t was less than 0.3 second during which Relative ratio of ink droplet rate became at most 70 percent E: at 3-second intermittent ejection, ink droplets were not ejected <<Ink-Jet Image Recording>>

(Image Recording A)

A shuttle head of piezo type having a nozzle aperture diameter of 25 μm, a nozzle number 512, with a recording resolution of 1440×1441 dpi (here, dpi indicates a dot number within a 2.54 cm) was employed. An amount of jetted ink was 10 ml/m² and the recording size was 280×200 mm. The pigment inks 1-8 and dye inks 1 and 2 were jetted on a A4 sized first class plain paper produced by Konica Minolta Business Technology Co., to form a solid image, and also an image of the following Japanese characters (Hiragana) with a resolution of 1440×1440 dpi employing an MS Ming font of a size of 3-point and 4-point to produce Images 1-10: あ, い, う, え, お

(Image Recording B)

A line arrayed head of piezo type having a nozzle aperture diameter of 25 μm, a nozzle number 512, with a recording resolution of 1440×1441 dpi was employed. An amount of jetted ink was 10 ml/m² and the recording size was 280×200 mm. The pigment inks 9-18 and dye inks 3-5 were jetted on a A4 sized first class plain paper produced by Konica Minolta Business Technology Inc., to form a solid image, and also an image of the following Japanese characters (Hiragana) with a resolution of 1440×1440 dpi employing a Ming font of a size of 3-point and 4-point to produce Images 11-23: あ, い, う, え, お

<<Evaluation of Recorded Image>>

The above prepared images were evaluated based on the criteria below.

(Evaluation of Penetration Resistance)

The above prepared solid images were evaluated by measuring the density of the printed portion and non-printed portion of the printed side (called as A side) and the reverse side (called as B side). The image penetration density ratio was defined according to the following scheme, and penetration resistance was determined by the criteria below.

(Ratio of penetration)=[(Density of image portion of B side)−(Density of non-image portion of B side)/(Density of image portion of A side)−(Density of non-image portion of A side)]×100 (%)

A: Ratio of penetration is less than 10%

B: Ratio of penetration is from not less than 10 to less than 20%

C: Ratio of penetration is from not less than 20 to less than 30%

D: Ratio of penetration is from not less than 30 to less than 50%

E: Ratio of penetration is from not less than 50%

<<Evaluation of Character Quality>>

The printed Japanese character in a Ming font of a size of 3-point and 4-point: あ, い, う, え, お
were visually observed and character quality was evaluated based on the criteria below.

A: all 3-point characters are clearly recorded in detail

B: it is easy to read 3-point characters

C: it is observed a partial deterioration in 3-point characters, but it is possible to read 4-point characters D: it is observed a partial deterioration in 4-point E: it is observed a large amount of deterioration in 4-point and is difficult to read.

(Evaluation of Curling)

The above prepared solid images were kept under the following 3 conditions for one week, and then evaluated the curling property according to the criteria below.

Condition 1: 23° C., 20% RH

Condition 2: 23° C., 55% RH

Condition 3: 23° C., 80% RH

A: not observed bending having more than 2 mm in the edge portion of the sample kept in any conditions, and not observed any cockling B: not observed bending having more than 5 mm in the edge portion of the sample kept in any conditions, and not observed any cockling C: not observed bending having more than 10 mm in the edge portion of the sample kept in any conditions, but observed slight cockling D: not observed bending having more than 30 mm in the edge portion of the sample kept in any conditions, but observed definite cockling E: observed bending having more than 30 mm in the edge portion of the sample kept in any conditions

TABLE 3

| Image No. | Image recording method | Ink Type | Ejection Adaptability | Decap Resistance | Penetration Resistance | Character Quality | Curing | Remarks |
|---|---|---|---|---|---|---|---|---|
| 1 | A | Pigment Ink 1 | A | B | A | A | B | Inv. |
| 2 | A | Pigment Ink 2 | A | A | A | A | A | Inv. |
| 3 | A | Pigment Ink 3 | B | A | B | A | A | Inv. |

TABLE 3-continued

| Image No. | Image recording method | Ink Type | Ejection Adaptability | Decap Resistance | Penetration Resistance | Character Quality | Curing | Remarks |
|---|---|---|---|---|---|---|---|---|
| 4 | A | Pigment Ink 4 | B | A | A | B | C | Inv. |
| 5 | A | Dye Ink 1 | C | A | B | B | A | Inv. |
| 6 | A | Pigment Ink 5 | B | D | B | B | E | Comp. |
| 7 | A | Pigment Ink 6 | B | A | E | D | A | Comp. |
| 11 | B | Pigment Ink 9 | A | B | A | A | B | Inv. |
| 12 | B | Pigment Ink 10 | A | A | A | A | A | Inv. |
| 13 | B | Pigment Ink 11 | A | A | A | A | A | Inv. |
| 14 | B | Pigment Ink 12 | B | A | B | A | A | Inv. |
| 15 | B | Dye Ink 3 | A | A | B | B | A | Inv. |
| 16 | B | Dye Ink 4 | A | C | B | B | A | Inv. |
| 17 | B | Pigment Ink 13 | C | B | B | B | A | Inv. |
| 18 | B | Pigment Ink 14 | C | C | B | B | B | Inv. |
| 19 | B | Pigment Ink 15 | C | D | B | B | E | Comp. |
| 20 | B | Pigment Ink 16 | B | A | E | D | A | Comp. |
| 22 | B | Pigment Ink 17 | Unable to eject | — | Unable to print | Unable to print | Unable to print | Comp. |

Inv.: Present invention
Comp.: Comparison

The results of Table 3 clearly show the followings. The water-soluble solvents having a surface tension, a viscosity and a vapor pressure defined by the present invention and the inks containing a water content defined by the present invention exhibit superior properties compared to the comparative samples, with respect to ink ejection adaptability and decap property. The images formed by using the ink on a plain paper have a superior penetration property, character printing quality and curling resistance.

It was demonstrated, by looking at the test results, that the more pronounced inventive effects were achieved by the ink having a pigment as a colorant, and printed with a printer equipped with a line head.

Example 2

Ink-jet images were produced in the same manner as Example 1 except for printed on two surface side of a plain paper. The images thus produced were subjected to the same evaluations of Penetration Resistance, Character Quality and Curling Resistance in Example 1. It was demonstrated that the images produced by the ink of the present invention obviously achieved the inventive effects of the invention compared to the comparative examples.

Example 3

<<Preparation of Inks>>

(Preparation of Pigment Inks 101-113 and Comparative Inks 101-106)

A pigment, a water-soluble organic solvent, water, a surface active agent and a dispersing agent were mixed as are listed in Table 101 and Table 102. Thereafter, each of the resulting mixtures was dispersed over a period of two hours, employing a paint shaker, whereby each of the pigment dispersions was prepared. Subsequently, the resulting liquid composition was subjected to filtration and also to a membrane degassing treatment employing a hollow fiber membrane, whereby Pigment Inks 101-113 and Comparative Inks 101-106 were prepared.

In the preparation, Dispersing agent A was used as a dispersing agent. Dispersing agent A is a copolymer of methacrylic acid, methyl methacrylate, ethylhexyl methacrylate and hydroxyethyl acrylate, and has a molecular weight of 12,000. $S_0$, $S_1$, $S_2$, and $S_3$ in Table 101 and Table 102 each represents a $S_i$ value of water and Solvents 1-3. $C_0$-$C_3$ represents a weight ratio (%) of water and solvents.

TABLE 101

| | Solvent ($S_0$) | $C_0$ (%) | Solvent 1 ($S_1$) | $C_1$ (%) | Solvent 2 ($S_2$) | $C_2$ (%) | Solvent 3 ($S_3$) | $C_3$ (%) | Surface Active Agent | Amount | Dispersing Agent | Amount | Colorant | Amount |
|---|---|---|---|---|---|---|---|---|---|---|---|---|---|---|
| Pigment Ink 101 | Water (55.6) | 42 | *1 (6.1) | 53 | | | | | | | Dispersing Agent A | 1.67 | Carbon black | 3.33 |
| Pigment Ink 102 | Water (55.6) | 19 | *2 (14.9) | 77 | | | | | | | Dispersing Agent A | 1.33 | Pigment Yellow | 2.67 |

TABLE 101-continued

| | Solvent ($S_o$) | $C_0$ (%) | Solvent 1 ($S_1$) | $C_1$ (%) | Solvent 2 ($S_2$) | $C_2$ (%) | Solvent 3 ($S_3$) | $C_3$ (%) | Surface Active Agent | Amount | Dispersing Agent | Amount | Colorant | Amount |
|---|---|---|---|---|---|---|---|---|---|---|---|---|---|---|
| Pigment Ink 103 | Water (55.6) | 41 | *3 (4.8) | 55 | | | | | | | Dispersing Agent A | 1.33 | Carbon black | 2.67 |
| Pigment Ink 104 | Water (55.6) | 25.8 | *4 (7.5) | 40 | *8 (10.4) | 30 | | | Olfin E1010 | 1.2 | Dispersing Agent A | 1.00 | pigment Yellow 15:3 | 2.00 |
| Pigment Ink 105 | Water (55.6) | 24.8 | *5 (6.7) | 70 | | | | | Olfin E1010 | 0.2 | Dispersing Agent A | 1.67 | Pigment Yellow 128 | 3.33 |
| Pigment Ink 106 | Water (55.6) | 18.1 | *6 (19.2) | 20 | *9 (8.5) | 50 | *10 (32.2) | 7 | SDS | 0.4 | Dispersing Agent A | 1.50 | Pigment Red 122 | 3.00 |
| Pigment Ink 107 | Water (55.6) | 14 | *4 (7.5) | 70 | *10 (32.2) | 5 | *8 (26.3) | 8 | | | Dispersing Agent A | 1.00 | Pigment Blue 15:3 | 2.00 |
| Pigment Ink 108 | Water (55.6) | 12 | *7 (16.9) | 72 | *8 (26.3) | 11 | | | | | Dispersing Agent A | 1.67 | Carbon black | 3.33 |
| Pigment Ink 109 | Water (55.6) | 25 | *5 (6.7) | 63 | Glycerin (32.6) | 8 | | | | | Dispersing Agent A | 1.33 | pigment Blue 15.3 | 2.67 |
| Pigment Ink 110 | Water (55.6) | 15 | *5 (6.7) | 80 | | | | | | | Dispersing Agent A | 1.67 | Carbon black | 3.33 |
| Pigment Ink 111 | Water (55.6) | 20 | *1 (6.1) | 55 | 2-Methyl-1-propanol (13.5) | 20 | | | | | Dispersing Agent A | 1.67 | Pigment Yellow 74 | 3.33 |
| Pigment Ink 112 | Water (55.6) | 25 | *3 (4.8) | 71 | | | | | | | Dispersing Agent A | 1.33 | Pigment Red 122 | 2.67 |
| Pigment Ink 113 | Water (55.6) | 18 | *5 (6.7) | 52 | *5 (4.8) | 27 | | | | | Dispersing Agent A | | Pigment Blue 15:3 | 2.00 |

*1: Triethylene glycol monomethyl ether
*2: Dipropylene glycol
*3: Tripropylene glycol monomethyl ether
*4: Diethylene glycol monomethyl ether
*5: Dipropylene glycol monomethyl ether
*6: 3-Methyl-1,3-butanediol
*7: 2-Methyl-2,4-pentanediol
*8: Triprolylene glycol
*9: Diethylene glycol monobutyl ether
*10: Ethylene glycol

TABLE 102

| | Solvent ($S_o$, $S_1$) | $C_0$, $C_1$ (%) | Solvent 1 ($S_1$) | $C_1$ (%) | Solvent 2 ($S_2$) | $C_2$ (%) | Solvent 3 ($S_3$) | $C_3$ (%) | Surface Active Agent | Amount | Dispersing Agent | Amount | Colorant | Amount |
|---|---|---|---|---|---|---|---|---|---|---|---|---|---|---|
| Comparative Ink 101 | Heptadecane (0) | 95 | | | | | | | | | Dispersing Agent A | 1.67 | Carbon black | 3.33 |
| Comparative Ink 102 | Water (55.6) | 8 | *1 (4.8) | 58 | *4 (8.5) | 30 | | | | | Dispersing Agent A | 1.33 | Pigment Red 122 | 2.67 |
| Comparative Ink 103 | Water (55.6) | 38 | *2 (32.2) | 22 | *5 (26.3) | 35 | | | | | Dispersing Agent A | 1.67 | Carbon black | 3.33 |
| Comparative Ink 104 | Water (55.6) | 40 | *2 (32.2) | 15 | *6 (22.2) | 40 | | | Olfin E1010 | 1 | Dispersing Agent A | 1.33 | Pigment Yellow 74 | 2.67 |
| Comparative Ink 105 | Water (55.6) | 51.7 | *2 (32.2) | 5 | *7 (11.7) | 33 | *1 (4.8) | 5 | Olfin E1010 | 0.3 | Dispersing Agent A | 1.67 | Carbon black | 3.33 |
| Comparative Ink 106 | Water (55.6) | 65.8 | *3 (13.3) | 15 | Glycerin (32.6) | 10 | 2-Hexanediol (16.9) | 5 | Olfin E1010 | 1.2 | Dispersing Agent A | 1.00 | Pigment Blue 15:3 | 2.00 |

*1: Tripropylene glycol monomethyl ether
*2: Ethylene glycol
*3: Triethylene glycol
*4: Diethylene glycol monobutyl ether
*5: Triprolylene glycol
*6: 2,3-butanediol
*7: 2-Pyrrolidone SDS: sodium dodecylsulfonate Olfin E1010: adduct of acetylene diol to ethylene oxide (10 mols) (manufactured by Nissin Chemical Industry)

<<Ink-Jet Image Recording>>

An on-demand ink-jet printer equipped with an ink-jet head of piezo type having a nozzle aperture diameter of 23 μm, a nozzle number 128 per one color, a nozzle density of 90 dpi, with a recording resolution of 1440×1441 dpi (here, dpi indicates a dot number within a 2.54 cm) was employed. A volume of each droplet is controlled to be 6 pl. The aforesaid ink-jet inks are set and a plain paper (Konica copy paper NR-A100, produced by Konica Minolta Business Technology Inc.) in a paper supply tray of the ink-jet printer. A solid image of a size of 10 cm×10 cm was prepared by using each of the inks in such a manner as each solid image is juxtaposed with one another. A slow speed printing mode (printing speed of 3 m/minutes in the sub-scanning direction) and a high speed printing mode (printing speed of 5 m/minutes in the sub-scanning direction) were applied to prepare image samples. Each image samples thus obtained were evaluated regarding the following properties.

<<Evaluation of Recorded Image>>

(Evaluation of Penetration Resistance)

The above prepared images printed on the plain paper (Konica Copy Paper NR-A100) were visually evaluated by observing the reverse side of the paper. The evaluation was done based on the criteria below.

A: bleeding and penetration to the reverse side is not observed at all
B: bleeding and penetration to the reverse side is slightly observed but is acceptable for reverse side printing
C: bleeding and penetration to the reverse side is observed but is still acceptable for reverse side printing
D: bleeding and penetration to the reverse side is clearly observed and is not acceptable for reverse side printing
E: bleeding and penetration to the reverse side is severely observed and is not acceptable for reverse side printing (Evaluation of Curling Resistance)

The above-mentioned solid image samples of a size of 10 cm×10 cm were left still for 3 minutes after finishing the printing, then the degree of curling of the samples was measured. The evaluation was done based on the criteria below.

A: no curling is detected
B: slight curling is detected
C: slight extension of paper and weak curling are detected, but their degrees are acceptable for practical use
D: strong extension of paper and strong curling are detected, and their degrees are unacceptable for practical use
E: very strong extension of paper and very strong curling are detected, and their degrees are unacceptable for practical use (Evaluation of Ink Transfer to the Reverse Side of Another Paper Superimposed)

The above-mentioned solid images were continuously printed on 200 sheets of paper. The printed samples were piled in a catch tray and the printed image quality was visually evaluated by checking ink transport to the reverse side of the paper superimposed from the solid image.

The evaluation was done based on the criteria below.

A: no ink transfer is observed to the reverse side of another paper superimposed
B: slight ink transfer is observed
C: weak ink transfer is observed
D: strong ink transfer is observed
E: very strong ink transfer is observed (Evaluation of Both Sides Printing Aptitude)

The 200 sheets of printed paper used for the above-described ink transfer evaluation were newly set in the paper supply tray of the ink-jet printer. Then, the solid image was printed on the unprinted surface side of the paper.

The aptitude of both side printing was evaluated by visual observation of convey defect of the paper or stain in the conveying portion during or after printing.

A: not observed any convey defect of the paper, and not observed any stain in the conveying portion
B: not observed any convey defect of the paper, and observed very slight stain in the conveying portion
C: not observed any convey defect of the paper, and observed weak stain in the conveying portion which is acceptable for practical use
D: observed a few convey defect of the paper during continuous printing, and observed strong stain in the conveying portion
E: observed frequent convey defect of the paper during continuous printing, and observed very strong stain in the conveying portion The evaluation results obtained at low printing speed and at high printing speed using Pigment Inks 101-113 and Comparative Inks 101-106 were listed in Table 103.

TABLE 103

| | Properties of Ink | | | | | Slow speed printing | | | High speed printing | | | |
|---|---|---|---|---|---|---|---|---|---|---|---|---|
| | $\Sigma S_i C_i$ | Content ratio of water (%) | Content ratio of surface active agent (%) | Amount of solvent having $25 \leq \Sigma S_i C_i < 55$ (%) | Surface tension (mN/m) | Reverse Penetration | Curling | Transfer to the reverse side of superimposed paper | Reverse Penetration | Curling | Transfer to the reverse side of superimposed paper | Two side printing aptitude |
| Pigment Ink 101 | 26.6 | 42 | 0 | 0 | 45 | A | B | B | A | B | C | C |
| Pigment Ink 102 | 22.0 | 19 | 0 | 0 | 40 | A | A | B | A | A | C | B |
| Pigment Ink 103 | 25.4 | 41 | 0 | 0 | 33 | C | B | A | A | B | B | A |
| Pigment Ink 104 | 20.5 | 25.8 | 1.2 | 0 | 31 | B | C | B | C | C | B | B |
| Pigment Ink 105 | 18.5 | 24.8 | 0.2 | 0 | 32 | B | B | A | B | B | A | A |
| Pigment Ink 106 | 20.4 | 18.1 | 0.4 | 7 | 31 | A | C | A | B | C | A | B |
| Pigment Ink 107 | 16.7 | 14 | 0 | 13 | 33 | A | C | A | A | C | A | A |
| Pigment Ink 108 | 21.7 | 12 | 0 | 11 | 30 | A | C | A | A | C | A | A |

TABLE 103-continued

| | Properties of Ink | | | | | Slow speed printing | | | High peed printing | | | |
|---|---|---|---|---|---|---|---|---|---|---|---|---|
| | $\Sigma S_i C_i$ | Content ratio of water (%) | Content ratio of surface active agent (%) | Amount of solvent having $25 \leq \Sigma S_i C_i < 55$ (%) | Surface tension (mN/m) | Reverse Penetration | Curling | Transfer to the reverse side of superimposed paper | Reverse Penetration | Curling | Transfer to the reverse side of superimposed paper | Two side printing aptitude |
| Pigment Ink 109 | 20.7 | 25 | 0 | 8 | 32 | A | B | A | A | B | A | A |
| Pigment Ink 110 | 13.7 | 15 | 0 | 0 | 31 | A | A | A | A | A | A | A |
| Pigment Ink 111 | 17.2 | 20 | 0 | 0 | 30 | A | A | A | A | A | A | A |
| Pigment Ink 112 | 17.3 | 25 | 0 | 0 | 32 | A | A | A | A | A | A | A |
| Pigment Ink 113 | 14.8 | 18 | 0 | 0 | 32 | A | A | A | A | A | A | A |
| Comparative Ink 101 | 0.0 | 0 | 0 | 0 | 28 | E | A | A | E | A | D | D |
| Comparative Ink 102 | 9.8 | 8 | 0 | 0 | 35 | D | A | B | D | A | D | D |
| Comparative Ink 103 | 37.4 | 38 | 0 | 57 | 50 | A | D | C | A | D | D | D |
| Comparative Ink 104 | 36.0 | 40 | 1 | 15 | 32 | B | D | B | B | D | D | D |
| Comparative Ink 105 | 34.5 | 51.7 | 0.3 | 5 | 33 | B | D | E | B | D | D | D |
| Comparative Ink 106 | 42.7 | 65.8 | 1.2 | 10 | 32 | A | E | E | A | E | E | E |

Printed samples using Pigment Inks 101-113 of the present invention are demonstrated to be excellent with respect to the total performance of the ink-jet printing.

What is claimed is:

1. An ink for ink-jet recording comprising:
   a colorant; and
   a solvent mixture containing water and solvent A which is not water,
   wherein solvent A has a surface tension of 25 to 40 mN/m at 25° C.; a viscosity of 1 to 50 mPs·s at 25° C.; and a vapor pressure of not more than 133 Pa at 25° C.,
   a content of solvent A is from not less than 50 to less than 90 weight % based on the total weight of the ink; and
   a content of water is from not less than 12 to less than 45 weight % based on the total weight of the ink.

2. The ink for ink-jet recording of claim 1, a mixing ratio of solvent A to water is in the range to form a uniform mixture at 25° C.

3. The ink for ink-jet recording of claim 1, wherein the ink has a surface tension of 25 to 35 mN/m at 25° C.

4. The ink for ink-jet recording of claim 1, wherein the ink has a viscosity of 5 to 40 mPs·s at 25° C.

5. The ink for ink-jet recording of claim 1, wherein the colorant is a pigment.

6. A method for recording an ink-jet image comprising the step of:
   jetting the ink for ink-jet recording of claim 1 from a plurality of nozzles of an ink-jet head onto two sides of a plain paper.

7. A method for recording an ink-jet image comprising the step of:
   jetting the ink for ink-jet recording of claim 1 from a plurality of nozzles of an ink-jet head onto a plain paper,
   wherein the ink-jet head is a piezo type head and each nozzles has a diameter of not more than 30 mm.

8. A method for recording an ink-jet image comprising the step of:
   jetting the ink for ink-jet recording of claim 1 from a plurality of nozzles of an ink-jet head onto a plain paper,
   wherein the ink-jet head is a line head of a piezo type and each nozzles has a diameter of not more than 30 mm.

9. An ink for ink-jet recording comprising:
   a colorant; and
   a solvent mixture;
   said solvent mixture comprising water and at least a first solvent which is not water, a content of water being not less than 12 to less than 45 weight % based on the total weight of the solvent mixture,
   said ink having a $\Sigma S_i C_i$ value in the range of from not less than 6 to less than 35, wherein the $\Sigma S_i C_i$ value is the sum for all solvents, where $C_i$ is a weight ratio for each solvent in the solvent mixture, and $S_i$ for each solvent is defined by Equation (1):

$$S_i = (H_i/M_i) \times 1000 \qquad \text{Equation (1)}$$

wherein $H_i$ is a total number of hydroxyl groups and of amino groups in the molecule; and $M_i$ is a molecular weight of the molecule.

10. The ink of claim 9, wherein the solvent mixture contains water and a first solvent, and wherein $\Sigma S_i C_i$ is defined by Equation (2):

$$\Sigma S_i C_i = (S_0 \times C_0) + (S_1 \times C_1) \qquad \text{Equation (2)}$$

wherein $S_0$ represents $S_i$ of the water, $C_0$ represents a weight ratio of the water in the ink;
$S_1$ represents $S_i$ of a first solvent, $C_1$ represents a weight ratio of the first solvent in the ink.

11. The ink of claim 9, wherein the solvent mixture further contains a second solvent other than water and the first solvent, and wherein $\Sigma S_i C_i$ is defined by Equation (3):

$$\Sigma S_i C_i = (S_0 \times C_0) + (S_1 \times C_1) + (S_2 \times C_2) \qquad \text{Equation (3)}$$

wherein $S_0$ represents $S_i$ of the water, $C_0$ represents a weight ratio of the water in the ink;
$S_1$ represents $S_i$ of the first solvent, $C_1$ represents a weight ratio of the first solvent in the ink; and $S_2$ represents $S_i$ of the second solvent, $C_2$ represents a weight ratio of the second solvent in the ink.

12. The ink for ink-jet recording of claim 9, wherein the $\Sigma S_i C_i$ value of the ink is in the range of from not less than 6 to less than 25.

13. The ink for ink-jet recording of claim 9, further comprises a surface active agent in an amount of less than 1 weight % based on the total weight of the ink.

14. The ink for ink-jet recording of claim 13, the amount of the surface active agent in the ink is less than 0.1 weight % based on the total weight of the ink.

15. The ink for ink-jet recording of claim 9, a total amount of the solvents each having $S_i$ in the range of not less than 25 to less than 55 is less than 10 weight % based on the total weight of the ink.

16. The ink for ink-jet recording of claim 15, the total amount of the solvents each having $S_i$ in the range of not less than 25 to less than 55 is less than 5 weight % based on the total weight of the ink.

17. The ink for ink-jet recording of claim 9, wherein the ink has a surface tension of 25 to 35 mN/m at 25° C.

18. The ink for ink-jet recording of claim 9, wherein the colorant is a pigment.

19. A method for recording an ink-jet image comprising the step of:
jetting the ink for ink-jet recording of claim 9 from a plurality of nozzles of an ink-jet head onto a plain paper.

20. A method for recording an ink-jet image comprising the step of:
jetting the ink for ink-jet recording of claim 9 from a plurality of nozzles of an ink-jet head onto a plain paper,
wherein the ink-jet head moves at a speed of 5 meter per minutes in a sub-scanning direction of the plain paper.

21. A method for recording an ink-jet image comprising the step of:
jetting the ink for ink-jet recording of claim 9 from a plurality of nozzles of an ink-jet head onto two sides of a plain paper.

* * * * *